United States Patent
Khan (10) Patent No.: US 6,597,632 B2
(45) Date of Patent: Jul. 22, 2003

(54) MAPPING SUBSURFACE FRACTURES USING NONLINEARITY MEASUREMENTS

(75) Inventor: Tawassul Ali Khan, Cypress, TX (US)

(73) Assignee: Nonlinear Seismic Imaging, Inc.

( * ) Notice: Subject to any disclaimer, the term of this patent is extended or adjusted under 35 U.S.C. 154(b) by 159 days.

(21) Appl. No.: 09/795,137

(22) Filed: Mar. 1, 2001

(65) Prior Publication Data

US 2002/0122352 A1 Sep. 5, 2002

(51) Int. Cl.⁷ ................................................ G01V 1/00
(52) U.S. Cl. ........................................ 367/32; 367/57
(58) Field of Search ............................. 367/30, 57, 32; 166/250.1

(56) References Cited

U.S. PATENT DOCUMENTS 5,963,508 A * 10/1999 Withers .................. 166/250.1
6,009,043 A * 12/1999 Chon et al. .................. 367/57
6,175,536 B1 * 1/2001 Khan .......................... 367/30

* cited by examiner

Primary Examiner—Gregory J. Toatley, Jr.
(74) Attorney, Agent, or Firm—Nonlinear Seismic Imaging, Inc.; Tawassul A. Khan; Sofia Khan McGuire (57) ABSTRACT

This Patent describes a method for determining the location and orientation of the open natural fractures in an earth formation by analyzing the interaction of the two seismic signals. One is a low frequency signal transmitted from the earth's surface and the other a high frequency signal transmitted from a wellbore. The compressional and the rarefaction cycles of the lower frequency signal are used to modulate the width of the open fractures, which changes their transmission characteristics. As a result, the amplitude of the high frequency signal gets modulated as it propagates through the open fractures. The result of the interaction of the high and low frequency seismic signals is recorded in another wellbore. The spectral analysis of the modulated signal that is recorded during compression and rarefaction cycles of the lower frequency surface generated signal is used to determine the location and the orientation of the open natural fractures.

9 Claims, 6 Drawing Sheets

MAPPING SUBSURFACE FRACTURES USING NONLINEARITY MEASUREMENTS

BACKGROUND OF THE INVENTION

1. Field of Invention

The present invention relates to mapping the open natural fractures in the petroleum reservoirs, more particularly identifying their location and their orientation in the existing oil fields.

2. Description of the Prior Art

In most of the carbonate and certain sandstone reservoirs natural fractures are encountered that are open and control the directional permeability and the effective flow pathways for the hydrocarbons. Mapping these fractures and their orientation is the key to the economic recovery of hydrocarbons from these reservoirs. At present, natural fracture characterization is of increasing importance, since the industry is venturing into increasing their producible reserves from the existing fields that are showing production decline.

Natural fractures in the subsurface rocks are usually vertical and are mostly found in the formations that have gone through structural deformation or have experienced regional stresses. These fractures commonly terminate at lithologic discontinuities within the reservoir formations. These fractures can be closely or widely spaced and irregularly distributed. Quite often, swarms of fractures are encountered with unfractured intervals in between. Economic hydrocarbon production from the fractured reservoirs requires an optimal access of the wellbore to the open fractures. This makes it extremely important that an accurate map of the open fracture system should be available prior to any field infill and development program.

In many cases, subsurface fractures are difficult or impossible to map adequately by using currently available technologies. Physical measurements through cores and well logs are limited to the vicinity of the wells drilled in the reservoir. The density of sampling the reservoir rock using cores and well logs quite often is not sufficient to provide any useful information regarding the orientation and the location of the fractures. This is due to two main characteristics of the majority of the wells that are drilled:

1) Both the wells and the fractures are generally vertical and parallel to each other; and
2) The wellbore is smaller than the fracture spacing between the larger fractures.

Horizontal drilling—where the cost of drilling a well is high—has to be designed to take the full advantage of the natural fractures that are open by mapping their location and their orientation. Since a single horizontal well is limited in producing from a few layers of the reservoir, it is important to identify the part of the reservoir from which the production can be optimized prior to drilling the well. This requires that the specific fractured beds should be identified prior to any drilling commitments.

This invention uses the nonlinearity of the seismic waves and its measurements to characterize the fractures as the waves propagate through the fractured rocks. Two seismic signals are used. One is a high-frequency seismic signal (the 'carrier' wave) transmitted from a wellbore, which penetrates the reservoir and travels through the fractured rock and is recorded by the receivers in another well. The other is a lower-frequency seismic signal (the 'modulation' wave) that is transmitted from the surface using a movable source like a surface seismic vibrator. In both cases, sinusoidal seismic signals of pre-selected frequencies are used. The lower-frequency source is located at predeterminned locations on the surface to modulate the open subsurface fractures with its compression and rarefaction alternate cycles.

The transmission characteristics of the fractured rock are measured (1) as the open fractures tend to close or are squeezed on a compression cycle; and (2) as the fractures tend to open on a rarefaction cycle of the low-frequency 'modulation' seismic signal.

The nonlinearity measurement can be made by analyzing the amplitude and the harmonics of the high-frequency 'carrier' wave during compression and by analyzing the rarefaction cycles of the low-frequency 'modulation' wave. During the compression cycle the stress across the fractures is increased; this tends to partially close the fractures thus reducing their nonlinearity effect and increasing the amplitude of the 'carrier' wave transmission. During the rarefaction cycle the stress across the fractures is decreased, thus tending to open the fractures and making their physical characteristics more nonlinear and reducing the amplitude of the high-frequency signal. During the compression and rarefaction cycles of the 'modulation' wave, the differences caused in the 'carrier' seismic wave due to nonlinearity are measured by the relative amplitude of the 'carrier' wave and its harmonics. This difference is maximum when the surface source that generates the lower-frequency 'modulation' wave is located at or near right angles to the open fractures.

This difference, mentioned above, will be zero when the surface source is located parallel to the fractures or directly above them, since the 'modulation' signal will have no squeezing effect on the width of the open fractures.

By moving the surface source to different locations on the surface and making measurements on the 'carrier' wave, the orientation of the fractures can be determined.

Since practically all the subsurface fractures are vertical, the fracture width of the open fractures is not modulated when the surface source is directly above them or aligned with the same angle as the fractures. The 'modulation' is maximum when the surface source is (1) at or near right angles to the fractures and (2) at a distant offset, so that the 'modulation' seismic signal is arriving at the fracture at a wide angle.

Once the fracture orientation is established, its location can be determined by moving the surface source in a straight line at right angles to the fractures until the differences in the amplitude and the nonlinearity between compression and rarefaction cycles becomes zero. At that point, the fractures are located directly below or along the plane of transmission of the surface 'modulation' source.

SUMMARY OF THE INVENTION

Briefly, the present invention provides a new and an accurate seismic method of mapping the orientation and location of the open natural fractures that are common in the hydrocarbon reservoirs. This invention creates a change in a controlled manner and uses the measurements of that change to characterize the fractured rock.

Two discrete seismic frequency signals are used. One is a high-frequency signal referred to in the description as a 'carrier' signal which is in the order of one hundred times higher frequency than the other lower-frequency signal, which is termed as a 'modulation' signal. The 'carrier' signal is transmitted using a seismic source located in a wellbore with multiple receivers located in an adjacent wellbore. More than one wellbore can be used for receivers to listen simultaneously and each wellbore can have multiple receivers, each receiver with its own independent output.

The borehole source can be moved up and down in the wellbore to cover different formations in the reservoir that may be fractured.

The lower-frequency 'modulation' signal source is located on the surface and can easily be deployed in any geometric pattern that is considered necessary to map the location and orientation of the fractures. Normally the surface sources can transmit higher energy seismic signals compared to the downhole transmitter; their signal strength can be in the order of one hundred times larger than the downhole source. Additionally, the lower frequencies are less attenuated as they travel through the earth. So the amplitude level of the 'modulation' signal available at the subsurface fractures can be very much larger than the high-frequency 'carrier' signal generated by the downhole source.

Experiments in rocks reveal a large nonlinear elastic wave response, far greater than that of gases, liquids, and most other solids. The large response is attributed to structural discontinuities, such as fractures, in the rocks (P. A. Johnson and K. R. McCall, Los Alamos National Laboratory, Los Alamos, N. Mex.). This nonlinear wave behavior implies that as the seismic wave propagates through the rock there is a local increase in the density and modulus during compression and a local decrease in density and modulus during rarefaction. The wave form begins to change shape and harmonics are generated. This effect is cumulative.

A large amplitude, low-frequency 'modulation' signal squeezes the open fractures during the compression cycle and opens them during the rarefaction cycle. The transmission of the 'carrier' wave through the swarm of fractures is affected by the compression and rarefaction cycles of the 'modulation' wave. Since the frequency of the 'carrier' wave is higher by roughly a factor of 100 and the signal strength of the low-frequency 'modulation' wave is considerably stronger, the interaction of the two waves can be measured. This interaction of the two waves, as they are transmitted through multiple open fractures, produces distortion and harmonics of the 'carrier' frequency. The harmonic content and the amplitude of the 'carrier' wave changes during the compression and the rarefaction periods of the 'modulation' wave. The effect, as the seismic signal travels through multiple fractures of a swarm, is cumulative.

The difference in the amplitude and the harmonic distortion of the 'carrier' wave between compression and rarefaction cycles of the 'modulation' wave is indicative of the angle at which the 'modulation' wave is intersecting the fractures. The maximum difference will occur when the 'modulation' wave is at right angles to the fractures and zero or near zero difference will occur when the 'modulation' signal is arriving from directly above or at a direction that is parallel to the fractures.

The measurements and the analyses of the 'carrier' wave signals recorded by the receiver array and transmitted by the downhole source are made for all the downhole source locations. The output from each source location is recorded by the receiver array, which may be 100 independent receiver signals, sampling the receiver well every 5 or 10 feet. The receiver array is long enough to provide the vertical coverage for the formations of interest. Each data set, when completed, will be a matrix 'n' number of downhole source locations 5 feet or 10 feet apart recorded in all the receivers in the receiver array, which may be 100 independent receiver signals. The 'n' number of downhole source locations will be sufficient to vertically sample the formations that are part of the reservoir suspected to have open fractures.

The entire recording procedure is repeated for multiple surface source locations, deployed in a geometric pattern. To describe it, a simple pattern is used to explain the concept. In real life, any other suitable pattern can be designed; multiple receiver wells can be used to record the data using a single source well to provide aerial coverage of the open fractures in the reservoir. The knowledge for such a design is known in the current art.

DESCRIPTION OF THE PREFERRED EMBODIMENT

Figure 1:
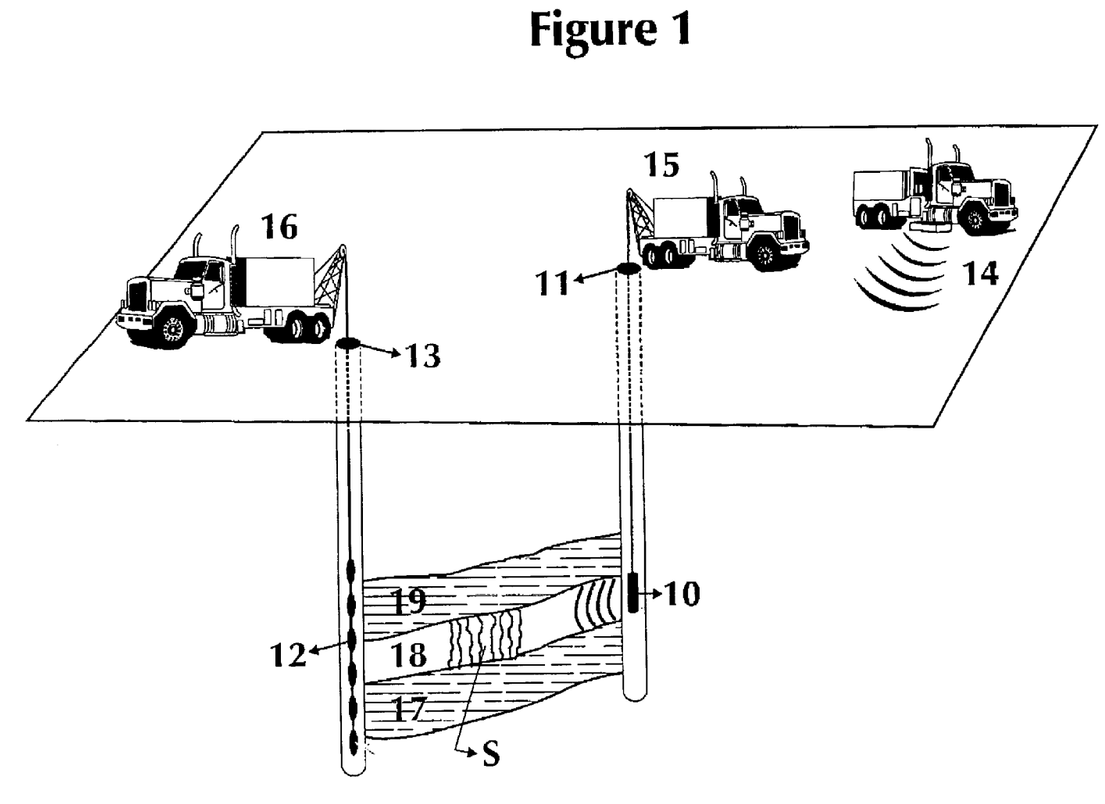
FIG. 1 is a schematic diagram that illustrates the field recording operation according to the present invention.

In the drawings, the basic concept of the field recording for fracture detection in accordance with the present invention is shown with a simple schematic at FIG. 1.

Downhole seismic source 10 is shown positioned at a selected depth in the source well 11, drilled through the reservoir composed of 17, 18, and 19 reservoir formations. An array of seismic receivers 12 is located at selected depths in the receiver well 13.

The downhole seismic source 10 is capable of transmitting discrete seismic frequencies over a broad seismic frequency range from 100 to 2,000 Hz. The source 10 can be deployed from the surface and positioned at any desired depth using devices 15 known in the art. The swarm of fractures to be mapped is shown as S in the formation 18.

For this application a discrete preselected frequency is used; for instance, a sinusoidal frequency of 1,000 Hz. The design of the source has to be such that the distortion of the output signal 1,000 Hz is in the order of −60 DB.

The second well that has receivers 13 can be located nominally from a few hundred to several thousand feet from the source well 11, and as shown in FIG. 1 penetrating the reservoir formations 17, 18, and 19. A downhole receiver array 12 with individual receivers, whose output can be recorded separately, is deployed in receiver well 13. The deployment and the recording of the output of the receivers 12 can be done and controlled from the surface control equipment 16 known in the art. The distortion of the receivers and the recording equipment has to be in the order of −80 DB.

A surface seismic vibrator 14 known in the current art is deployed on the surface. The seismic vibrator 14 is free to be positioned to transmit a discrete frequency, for instance 10 Hz, for a certain period of time—around 4 to 5 seconds. The surface source 14 and downhole source 10 can be synchronized to transmit their signals simultaneously. If necessary their starting times can be adjusted according to the well spacing between 11 and 13, the depth of the reservoir formations 17, 18, and 19, and the offset distance of the surface source 14 from the wells 11 and 13. Anyone familiar with current seismic data acquisition for 3D seismic or vertical seismic profiling can make those necessary adjustments.

The downhole source 10 is deployed at regular depth intervals in the order of 5 feet to 10 feet to cover vertically the reservoir formations 17, 18, and 19. In the receiver well 13, a downhole receiver array that may have 100 receivers is positioned to vertically sample the reservoir formations 17, 18, and 19 at 5 feet to 10 feet spacing to match the vertical resolution of the downhole source 10. The selection of the vertical sampling is based on the available geologic information and the bed thickness of formations 17, 18, and 19.

In the current available art, receiver arrays with 100 receivers each providing a separate output are available. The receiver array 12 could be such an array where receivers are spaced 5 feet to 10 feet apart, thus covering the whole zone of interest in the reservoir, the formations 17, 18, and 19.

The downhole source 10, which is a vibratory source currently available in the industry, transmits a seismic signal that is a discrete frequency 1000 Hz of around three to four seconds duration. The first set of recording is made without the surface source 14 being activated. For the second recording downhole source 10 is activated with identical transmission signal as for the first recording, but this time the surface source 14 is also activated at location 20, FIG. 2, to generate a low frequency 10 Hz signal in synchronization with the downhole source 10. The data is recorded for both first and second recording by the downhole receiver array 12 with 100 or similar, independent recording channels in the receiver well 13. The downhole source 10 is moved 5 feet or 10 feet according to the vertical resolution selected, and the recording procedure of transmitting 1000 Hz first without the surface source 14 and the second time with the surface source 14 being activated, is repeated. The number of recordings necessary to vertically cover the zone of interest in the reservoir formations 17, 18, and 19 are made. Once this sequence of recording is completed, the surface source 14 is moved to the next location 21 (FIG. 2).

After the first data are recorded for the first surface location 20 (FIG. 2), recording the crosswell data using downhole source 10 alone is not necessary. For all the other surface locations, both source 10 and source 14 are activated simultaneously.

Figure 2:
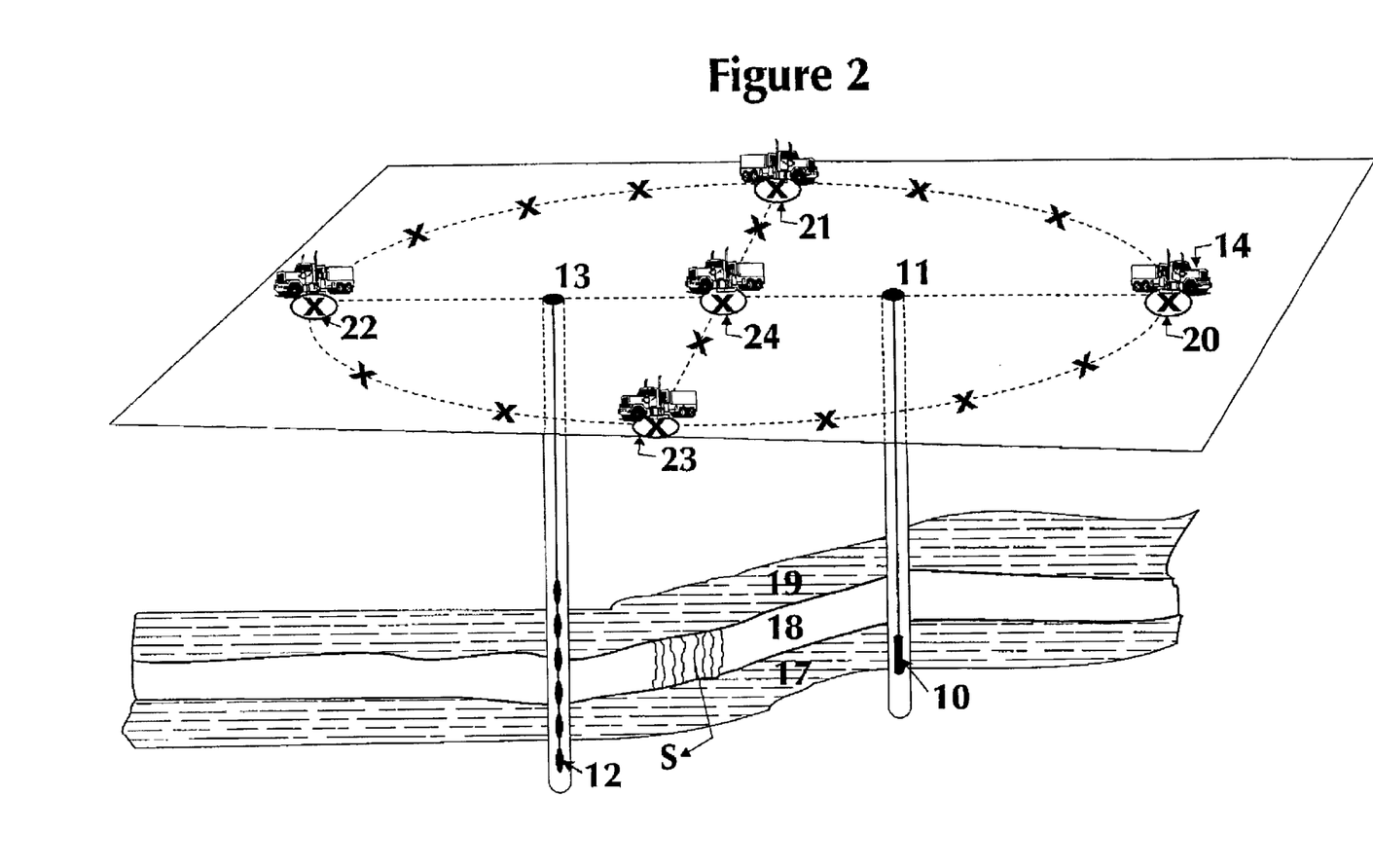
FIG. 2 shows the deployment pattern of the surface source to map the orientation and location of the fractures.

FIG. 2 shows a brief schematic of the surface source 14 deployment concept. In most cases the location and the orientation of the fractures is not known. This invention relates to detecting the location and orientation of the open fractures by modulating the fracture width with a surface seismic vibrator source 14 and measuring the changes in the transmission response of the high-frequency 'carrier' wave during the compression and rarefaction cycles of the low-frequency 'modulation' wave. The maximum change in the fracture width will be when the 'modulation' wave arrives at or near right angles to the fractures. There will be a zero change in the open fracture width when the 'modulation' wave arrives parallel to the fractures or from directly above them. For this reason, surface source 14, which generates the low-frequency 'modulation' wave, is deployed in a geometric pattern, on surface locations 20, 21, 22, 23 and 24. However depending on the need for accuracy in determining the fracture location and orientation, any suitable surface pattern can be designed. The design capability for such a pattern is available in the current art.

For each location 20, 21, 22, 23 and 24 of the surface source 14, a complete set of recordings using downhole source 10 that are required to cover the formations 17, 18, and 19, are made. The surface source pattern is not limited in any way and may have any number of surface source locations in any geometric pattern deemed necessary to map the fracture location and their orientation. At each location of the surface geometric pattern, data set is recorded, where the downhole source moves vertically with 5 feet to 10 feet spacing to cover the formations 17, 18, and 19. For each of these recordings, surface source 14 and downhole source 10 are activated simultaneously.

During the first recording one additional data set is recorded where the surface source 14 is not activated; only the downhole source 10 transmits its 'carrier' signal which is recorded by receivers 12. This data set can be used as a reference during data processing and analysis. It can be further used for rock property analysis as described in U.S. Pat. No. 6,175,536: 'CROSSWELL SEISMIC MAPPING FOR DETERMINING NONLINEAR PROPERTIES OF EARTH FORMATIONS BETWEEN WELLBORES' (Khan, January 2001).

Figure 3:
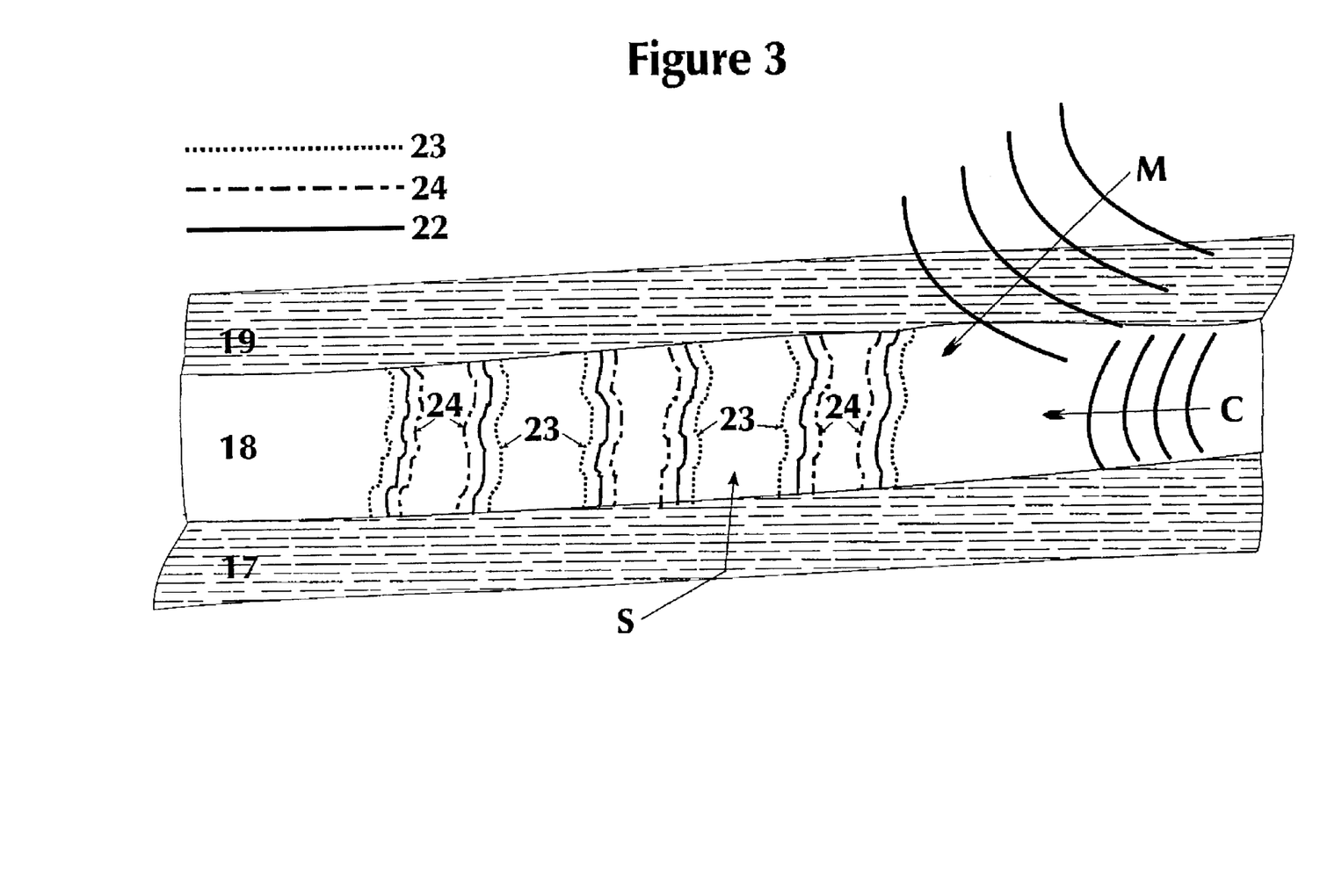
FIG. 3 is a schematic that illustrates the effect of the 'modulation' wave on the open fractures in the reservoir. During the compression cycle the fractures are squeezed and during the rarefaction cycle fractures are opened. The transmission of the 'carrier' wave through the fractures is affected by both the compression and rarefaction cycles of the 'modulation' wave.

FIG. 3 illustrates the changes in the width of the open fractures S when the 'modulation' wave M arrives at a wide angle nearer to 90 degrees from the vertical. The angle could be in the order of 50 to 60 degrees. Open fractures are compressed to position 24 during compression cycle of the 'modulation' wave and open to position 23 during rarefaction cycle of the 'modulation' wave. Since 'modulation' wave is a low-frequency wave, its wavelength is in the order of a thousand feet. So the compression and rarefaction cycles can cover a swarm of fractures that may spread over a few hundred feet. The spectrum and the amplitude of the high-frequency 'carrier' wave C, as it travels through the fractures, changes during the compression and the rarefaction cycles of the 'modulation' wave M. At 10 Hz, the cycle time of the 'modulation' wave is 100 milliseconds. So the compression and the rarefaction period will be 50 milliseconds each. During those 50 milliseconds, 50 complete cycles of the 'carrier' wave C will be transmitted through the fractures. Large frequency and amplitude differences between the 'modulation' and the 'carrier' wave make it easier to analyze the results by using Fast Fourier Transform or other similar techniques known in the art.

Figure 4:
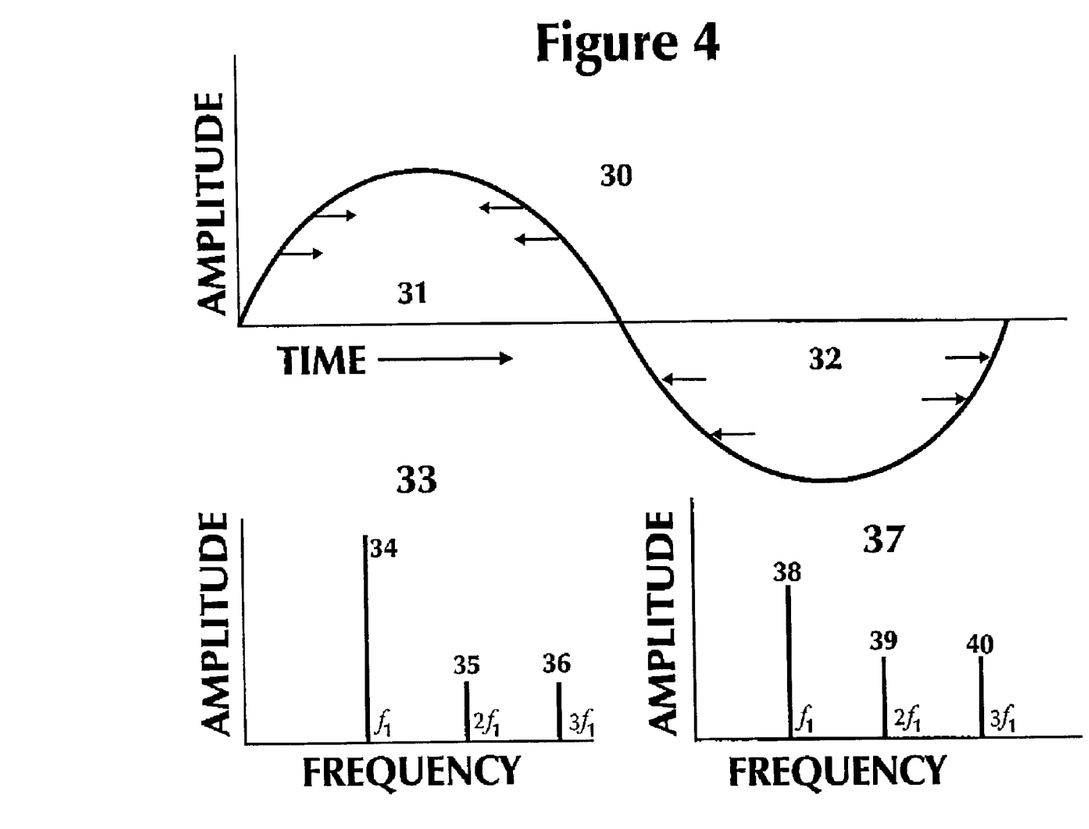
FIG. 4 is a display in frequency domain of the 'carrier' wave during compression and rarefaction cycle of the 'modulation' wave. During rarefaction cycle the amplitude of the fundamental frequency is reduced and the harmonic content is increased.

FIG. 4 illustrates the compression 31 and rarefaction 32 cycles of the low-frequency 'modulation' wave 30. Frequency spectrum of the 'carrier' wave during the compression cycle 33 and the rarefaction cycle 37 is shown.

During the compression cycle of the 'modulation' wave 31, the relative amplitude of the fundamental of the 'carrier' wave 34 is higher and the relative amplitude of the second and the third harmonics 35 and 36 is lower. During the rarefaction cycle of the 'modulation' wave 32, the fundamental 38 is lower in comparison with 34. The amplitude of the second and third harmonics 39 and 40 is larger in comparison with 35 and 36. This is caused by the higher nonlinearity and loss of the 'carrier' wave signal when the fractures are more open in the rarefaction cycle in comparison with the compression cycle. It is understood that there would be a certain amount of energy in the side lobes of the 'carrier' wave; since for a 'carrier' wave frequency of 1,000 Hz and 'modulation' wave frequency of 10 Hz, 990 Hz and 1,010 Hz side lobes will be generated. For the purpose of the invention, these side lobes can be considered as part of the 'carrier' wave measurements.

Figure 5:
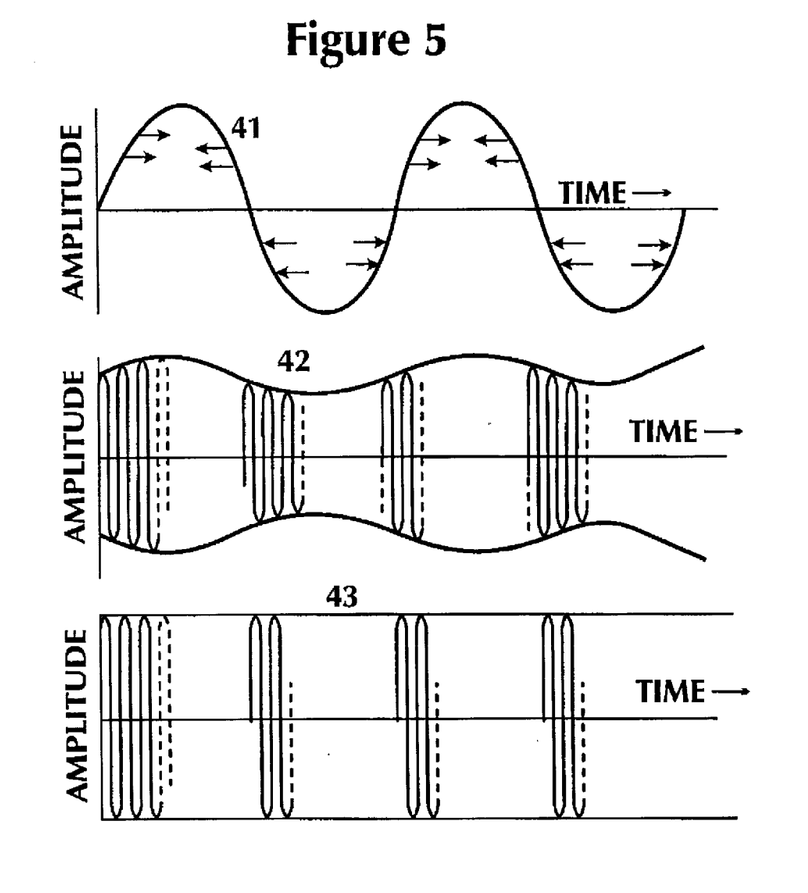
FIG. 5 is a simplified schematic that shows the changes in the high-frequency waveform due to the width 'modulation' of the open fractures during the compression and rarefaction cycles of the low-frequency wave.

FIG. 5 illustrates the effect of the 'modulation' wave on the 'carrier' wave transmission through the open fractures. We see an amplitude change in the 'carrier' waveform 42 during compression and rarefaction cycles of the 'modulation' wave 41. During the compression cycle, the relative amplitude of the 'carrier' wave is larger compared to the rarefaction cycle. The waveform 42 is the direct effect of the 'modulation' wave arriving at the fractures at a wide angle of 40 to 60 degrees. The 'carrier' waveform is shown in 43 when the 'modulation' wave arrives parallel to the fractures. The result of the interaction of the 'modulation' and 'carrier' signals or waves as they propagate through the fractures, can be detected and measured using data processing methods known in the art. As described earlier, by deploying the surface source 14 in a predetermined pattern, the location of the source 14, which gives maximum variation of the 'carrier' wave spectra during the alternate compression and rarefaction cycles of the 'modulation' wave, can be determined.

Figure 6:
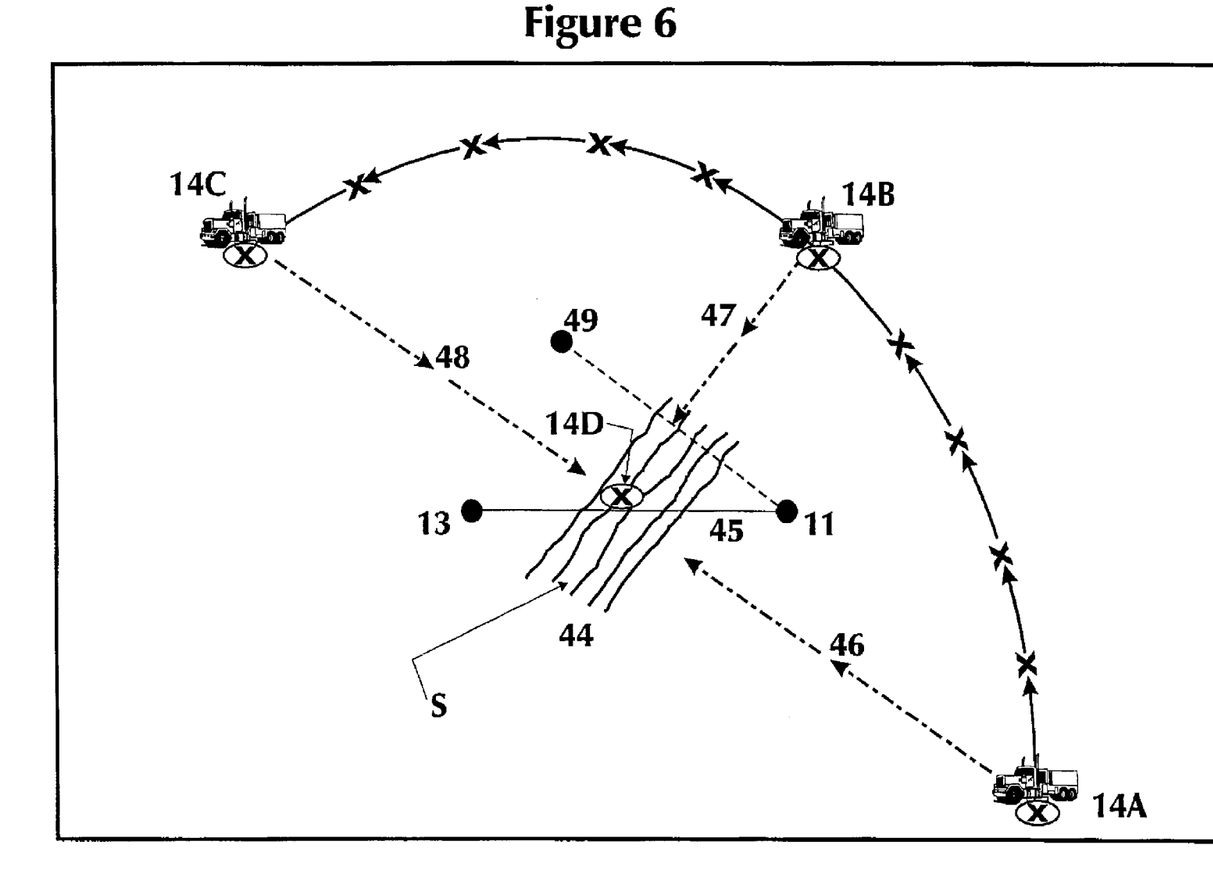
FIG. 6 is an illustrative schematic that shows a plan view of the surface source deployment in relation to the two wells being used for recording and the location and the orientation of the subsurface fractures.

FIG. 6 is a plan view of the source and receiver well locations 11 and 13. The location and the orientation of the fractures S are shown as 44. The travel path of the seismic signal transmitted from well 11 and received by the receiver array in well 13 is shown as 45. The source moves in a circular pattern at a predetermined offset, and recordings are made at regular surface intervals. As explained earlier, when the source is in position 14A, the energy travel path of the 'modulation' wave 46 is at right angles to the orientation of the fractures, and maximum amplitude and spectral variation of the 'carrier' wave between the compression and rarefaction cycles of the 'modulation' wave exists. As the source moves at regular intervals in the circular pattern, this difference is reduced until it becomes zero at source location 14B. This source location identifies the energy travel path of the 'modulation' wave 47, which is parallel to the fractures. The source moves along its circular pattern, until maximum variation is achieved again, at location 14C. To get a better fix of the location of the fractures, the surface source can be moved along the line between 14C and 14A, until it reaches 14D, where the spectral variation of the 'carrier' wave between the compression and rarefaction cycles of the 'modulation' wave is zero. This is right on top of the fractures. In this manner, the location and the orientation of the fractures between the two wells 11 and 13 can be identified. To improve the imaging efficiency of the fractures in a reservoir, multiple receiver wells all listening to the same source well can be used. The receiver well in array 49 can simultaneously record along with the receiver array in 13. Data can be processed, as explained earlier, to map the fracture location and orientation between source and receiver wells. This information can be correlated to image the fractures over a given area. The correlation methods are known in the industry.

The measurement of a high-frequency wave, when the open fractures in the reservoir formations are subjected to a relatively stronger low frequency signal, provides an ideal method to map the orientation and location of the fractures in the reservoirs. The above described method is superior to the current techniques since this invention makes direct measurements of the transmission characteristics of the fractures rather than the indirect measurements of velocity and amplitude that provide ambiguous results.

Having described the invention above, various modifications of the techniques, procedure, material and equipment will be apparent to those in the art. It is intended that all such variations within the scope and spirit of the appended claims be embraced thereby.

Fracture detection is also important in construction and in determining the safety of the larger structures like dams. The method described in the invention can be applied for similar applications.

What is claimed is:

1. A method for mapping the open fractures in an earth formation from two seismic signals transmitted into said formation: one high-frequency seismic signal transmitted from within one wellbore and received in another wellbore, and the other low-frequency seismic signal transmitted from the surface; both seismic signals synchronized and transmitted at preselected frequencies, the interaction of the two transmitted signals received and recorded by the down hole receivers; the method comprising:

spectrally analyzing said received signals; determining the interaction of the low- and high-frequency signals as they propagate through the open fractures; and determining the relative spectral amplitudes of the high-frequency signal that is transmitted from one wellbore and received in the other; specifically measuring the amplitude difference of the fundamental of the higher frequency and its harmonics during rarefaction and compression cycles of the lower-frequency signal.

2. The method as defined in claim 1 further comprising:

determining the spectral difference of the high-frequency 'carrier' signal between the rarefaction and compression cycle time windows of the lower-frequency 'modulation' signal for each specific surface source location which is part of a geometric pattern; and moving the surface source to the next location of the surface geometric pattern until the maximum and minimum spectral differences of the high-frequency 'carrier' wave between the 'compression' and rarefaction cycle time windows of the lower-frequency 'modulation' wave have been established.

3. The method in claim 1 further comprising:

determining of the location of the surface source that provides maximum relative spectral difference of the wellbore generated high-frequency 'carrier' signal, the spectral measurements of the high-frequency signal made during the compression and rarefaction cycle time windows of the lower-frequency surface generated 'modulation' wave, the location of the surface source identified to provide maximum spectral difference will provide the information related to the orientation of the fractures.

4. The method in claim 1 further comprising:

determining the location of the surface source that provides minimum spectral difference of the wellbore generated high-frequency 'carrier' signal during the compression and rarefaction cycle time windows of the low-frequency surface generated 'modulation' wave, the minimum difference will provide the information related to the orientation and the location of the fractures.

5. The method in claim 1 further comprising:

determining the relative amplitudes of the fundamental frequency of the wellbore generated high-frequency 'carrier' wave during the compression and rarefaction cycle time windows of the surface generated lower-frequency 'modulation' wave, these measurements made for every surface source location in the surface geometric pattern.

6. The method in claim 1 further comprising:

determining the relative amplitudes of the harmonic content of the wellbore generated high-frequency 'carrier' wave during the compression and rarefaction cycle time windows of the surface generated lower-frequency 'modulation' wave, these measurements made for every surface source location.

7. The method in claim 1 further comprising:

determining the number of compression and rarefaction cycles of the surface generated 'modulation' wave in the recorded wellbore signal, summing the corresponding compression cycle and rarefaction cycle data to improve the signal to noise ratio.

8. The method in claim 1 further comprising:

using the identified surface source locations that provide maximum and minimum spectral variation of the 'carrier' wave during compression and rarefaction cycles of the 'modulation' wave, also the locations that provide maximum differences in fundamental frequency amplitude and the relative amplitude of the harmonics, and using this information to map the orientation and location of the open fractures between the wellbores.

9. The method in claim 1 further comprising:

using multiple receiver wells for simultaneous recording while transmitting from a single source well, mapping the orientation and location between each source/receiver well pair, then using this information to image the open fractures over a specific area in an oilfield.

* * * * *